No. 705,300. Patented July 22, 1902.
E. A. ROLLMAN.
MACHINE FOR SORTING TOBACCO LEAVES.
(Application filed Mar. 27, 1902.)
(No Model.)

Witnesses
E. A. Rollman, Inventor,
by C. A. Snow & Co.
Attorneys

THE NORRIS PETERS CO., PHOTO-LITHO., WASHINGTON, D. C.

UNITED STATES PATENT OFFICE.

ELMER A. ROLLMAN, OF WEST MANCHESTER, OHIO.

MACHINE FOR SORTING TOBACCO-LEAVES.

SPECIFICATION forming part of Letters Patent No. 705,300, dated July 22, 1902.

Application filed March 27, 1902. Serial No. 100,290. (No model.)

*To all whom it may concern:*

Be it known that I, ELMER A. ROLLMAN, a citizen of the United States, residing at West Manchester, in the county of Preble and State of Ohio, have invented a new and useful Machine for Sorting Tobacco-Leaves, of which the following is a specification.

This invention relates to machines for sorting tobacco-leaves, and while herein defined as adaptable for the purpose above stated its use is not to be confined to that employment alone, as it may be utilized for sorting other materials and still be within the scope of the invention.

The object of the invention is in a ready, simple, feasible, and thoroughly-practical manner to obviate the necessity of the employment of a belt or equivalent means for holding the leaves in contact with the conveying means, and thus in position to be grasped by the sorting-rollers, obviating thereby any tendency of tearing or breaking the leaves, with attendant impediment of the work.

With these and other objects in view as will appear as the nature of the invention is better understood the same consists, generally stated, in a sorting-machine comprising sorting-rollers, conveying mechanism, and feeding means having a reciprocatory movement with relation to the conveying mechanism.

The invention consists, further, in the novel construction and combination of parts of a machine for sorting tobacco-leaves, as will be hereinafter fully described and claimed.

In the accompanying drawings, forming a part of this specification, and in which like numerals of reference indicate corresponding parts, there is illustrated one form of embodiment of the invention capable of carrying the same into practical operation, it being understood that the elements therein exhibited may be varied or changed as to shape, proportion, and exact manner of assemblage without departing from the spirit thereof, and in these drawings—

Figure 1:
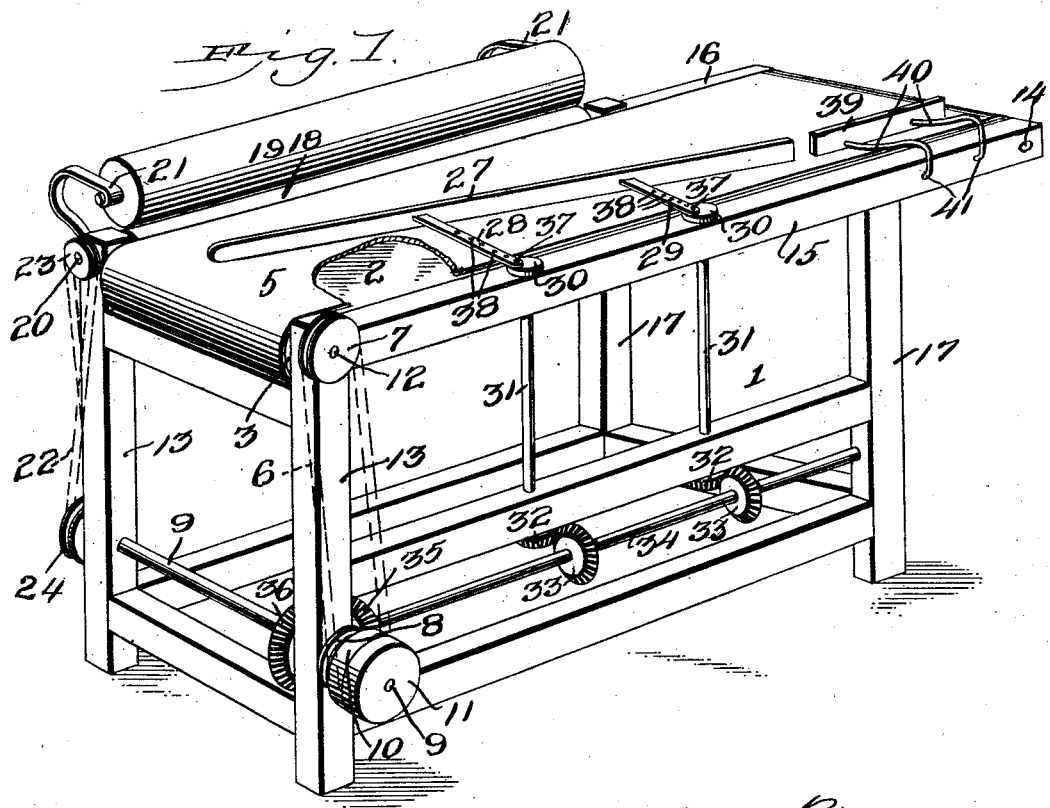
Figure 2:
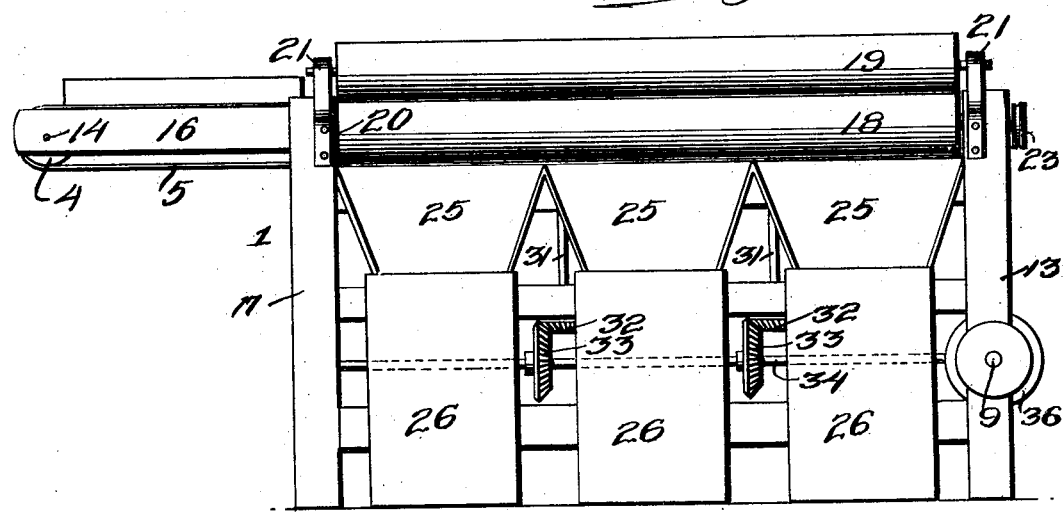

Figure 1 is a view in perspective of a machine embodying the essential features of the present invention. Fig. 2 is a view in side elevation viewed from the side opposite that shown in Fig. 1.

Referring to the drawings, 1 designates a supporting-frame, which may be of the usual or any preferred construction, associated with the upper portion of which is a table 2, adjacent to each end of which is mounted a roller 3 and 4, respectively, the latter being clearly shown in Fig. 2, and around these rollers is passed an endless conveyer 5, which may be of canvas or any other material suited to the purpose. Motion is imparted to the conveyer through the roller 3, the latter being driven from a belt 6, one bend of which engages a pulley 7, carried by the shaft of said roller, and the other bend a pulley 8, carried by a shaft 9, journaled in suitable bearings in the frame, the latter shaft being provided with a tight and a loose pulley 10 and 11, respectively, around which passes a belt (not shown) communicating with a suitable source of power. The shaft 12 of the roller 3 is in this instance journaled in two of the supporting-legs 13 of the frame, and the shaft 14 of the roller 4 is journaled in the two side frame-pieces 15 and 16, which at the feeding end of the machine or that at which the roller 4 is located are projected beyond the other pair of supporting-legs 17 to present a table for the workman.

The sorting-rollers 18 and 19 are disposed parallel with one side of the frame and are of less length than the conveyer, as usual, the roller 18 being supported upon a shaft 20, journaled in two of the legs 13 and 17, while the roller 19 is supported in spring-bearings 21, secured to the said legs, as shown in Fig. 2. Motion is imparted to the roller 18 through the medium of a belt 22, which passes around a pulley 23, carried by the shaft of said roller, and a pulley 24, carried by the shaft 9. Back of the rollers and disposed in any preferred manner with relation thereto is a series of chutes 25, leading to receptacles 26 for catching the sorted leaves. But three chutes and receptacles are herein shown; but it is to be understood that the number may be increased and still be within the scope of the invention.

The means for feeding the leaves to the sorting-rollers and which constitutes the gist of the present invention comprises a feeder or knocker 27, disposed obliquely to the conveyer and having associated with it mechanism for imparting a reciprocatory movement, thereby to effect a pushing action against the stalks of the leaves, which will operate to feed them to the sorting-rollers and at the same time to effect positive sorting. The said mechanism comprises two arms or links 28 and 29, rigidly secured at one end to the feeder, the arm 28 being the longer and being disposed toward the discharge end of the machine in order that the larger leaves will first be removed from the machine and then in progressive order the shorter ones. The terms "feed" and "discharge" end are herein employed merely for convenience, the feed end indicating that portion of the machine opposite which the operator stands and the discharge end the opposite terminal of the machine. The free ends of the arms or links are connected with two disks 30, carried by the upper ends of two shafts 31, journaled in the side pieces of the frame and carrying at their lower ends beveled gears 32 to mesh with similar gears 33, carried by a horizontal shaft 34, journaled in two of the legs of the frame, one end of the said shaft carrying a beveled gear 35, meshing with a similar gear 36, carried by the shaft 9, the latter constituting the main drive-shaft, as it will be seen that from this motion will be imparted to all of the different movable parts of the apparatus. Each of the disks carries an eccentrically-disposed pin 37, adapted to engage with orifices 38 in the arms 28 and 29, by which arrangement the feeder may be adjusted to leaves or articles of different lengths, and thereby extend the range of usefulness of the machine.

As a means for directing the leaves to the feeder a guide 39 is employed, which is secured to two arms 40, having inturned terminals disposed in openings 41 in the side piece 15, these arms being adapted for movement in the said opening, thereby to permit the guide to be adjusted with relation to the feeder.

The manner of operation of the machine is as follows: The conveyer and feeder being in operation and the guide being set, the operator places the stalks of the leaves against the guide and they are then carried forward by the conveyer and into engagement with the feeder, which latter, by impacting the stalks and by a dragging action due to the orbital path it describes, operates to move the leaves toward the sorting-rollers, which in the usual manner grasps their ends and feeds them to the receptacles. It will be seen that by this arrangement no pressure or weight is applied to the leaves while on the conveyer, and being thus free from restraint all danger of twisting or of breakage will positively be obviated.

The machine of this invention, while exceedingly simple of construction, will be found of the highest efficiency and durability in use, and by reason of the simplicity of its parts may in case of damage be readily repaired.

Having thus fully described my invention, what I claim as new, and desire to secure by Letters Patent, is—

1. A sorting-machine comprising sorting means, conveying mechanism, and feeding means having a reciprocatory movement with relation to the conveying mechanism.

2. A sorting-machine comprising sorting means, conveying mechanism, and feeding means obliquely disposed to the conveying mechanism and having a transverse movement with relation thereto.

3. A sorting-machine comprising sorting means, conveying mechanism, and feeding means obliquely disposed to the conveying mechanism and having an orbital movement with relation thereto.

4. A sorting-machine comprising sorting-rollers, conveying mechanism, and feeding means obliquely disposed to the conveying mechanism and having an orbital movement with relation thereto.

5. A sorting-machine comprising sorting-rollers, conveying mechanism, and adjustble feeding means obliquely disposed to the conveying mechanism and having an orbital movement with relation thereto.

6. A sorting-machine comprising sorting means, conveying mechanism, and feeding means having a movement transverse to that of the conveying mechanism.

7. In a sorting-machine, the combination with an endless conveyer and sorting means, of feeding means having a transverse movement with relation to the conveyer.

8. In a sorting-machine, the combination with an endless conveyer and sorting means, of feeding means obliquely disposed to the conveyer and having orbital movement with relation thereto.

9. A sorting-machine comprising sorting-rollers, conveying mechanism, feeding means having a reciprocatory movement with relation to the conveying mechanism, and a guide coacting with the feeding means.

10. A sorting-machine comprising sorting-rollers, conveying mechanism, adjustable feeding means having a reciprocatory movement with relation to the conveying mechanism, and an adjustable guide coacting with the said means.

11. A sorting-machine comprising sorting-rollers, conveying mechanism, and feeding means having a reciprocatory movement with relation to the conveying mechanism.

12. A sorting-machine comprising sorting-rollers, conveying mechanism, and reciprocatory feeding means disposed at an angle to the rollers.

In testimony that I claim the foregoing as my own I have hereto affixed my signature in the presence of two witnesses.

ELMER A. ROLLMAN.

Witnesses:
JULIA HOFFMAN,
J. W. HOFFMAN.